United States Patent
Tritschler et al.

(10) Patent No.: US 9,820,036 B1
(45) Date of Patent: Nov. 14, 2017

(54) SPEECH PROCESSING OF REFLECTED SOUND

(71) Applicant: Amazon Technologies, Inc., Seattle, WA (US)

(72) Inventors: Charles Tritschler, Los Altos, CA (US); Amit Singh Chhetri, Santa Clara, CA (US); Philip Ryan Hilmes, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/984,010

(22) Filed: Dec. 30, 2015

(51) Int. Cl.
| | |
|---|---|
| *H04R 1/00* | (2006.01) |
| *H04R 1/32* | (2006.01) |
| *G10L 19/008* | (2013.01) |
| *G10L 17/22* | (2013.01) |
| *G10L 19/02* | (2013.01) |

(52) U.S. Cl.
CPC ............ *H04R 1/326* (2013.01); *G10L 17/22* (2013.01); *G10L 19/008* (2013.01); *G10L 19/0212* (2013.01); *H04R 2203/12* (2013.01)

(58) Field of Classification Search
CPC . H04R 2203/12; H04R 1/326; G10L 19/0212; G10L 19/008; G10L 17/22
See application file for complete search history.

(56) References Cited

U.S. PATENT DOCUMENTS

| | | | | |
|---|---|---|---|---|
| 6,420,975 | B1 * | 7/2002 | DeLine | B60R 1/12 340/425.5 |
| 9,319,782 | B1 * | 4/2016 | Crump | H04R 3/02 |
| 2004/0208334 | A1 * | 10/2004 | Bryson | B60R 1/12 381/365 |
| 2012/0224456 | A1 * | 9/2012 | Visser | G01S 3/8006 367/127 |
| 2015/0215689 | A1 * | 7/2015 | Hartung | H04M 3/567 381/356 |

OTHER PUBLICATIONS

Herbig, et al. Binaural Beamforming: The Natural Evolution. Hearing Review. 2015; 22(5):24.
Dib, et al. Phased Arrays of Microphones—Sound Localization. American University of Beirut, Final Year Project 2006.
Siemens Product Lifecycle Management Software Inc. Technical Info Spherical Beamforming. 2014.

* cited by examiner

*Primary Examiner* — Muhammad N Edun
(74) *Attorney, Agent, or Firm* — Pierce Atwood LLP

(57) ABSTRACT

Sound is banked laterally over an array of microphones arranged on a rear surface of a device. Sound enters a duct behind the device from different directions via inlets along the sides of the device. The duct directs the sound waves across the microphone array. An effective direction from which the banked sounds originated is determined, relative to a front of the device. Based on the determined effective direction, the device applies spatial filtering to isolate the received sound waves, selectively increasing a signal-to-noise ratio of sound from the selected source and at least partially occluding sounds from other sources.

19 Claims, 12 Drawing Sheets

SPEECH PROCESSING OF REFLECTED SOUND

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

Figure 1:
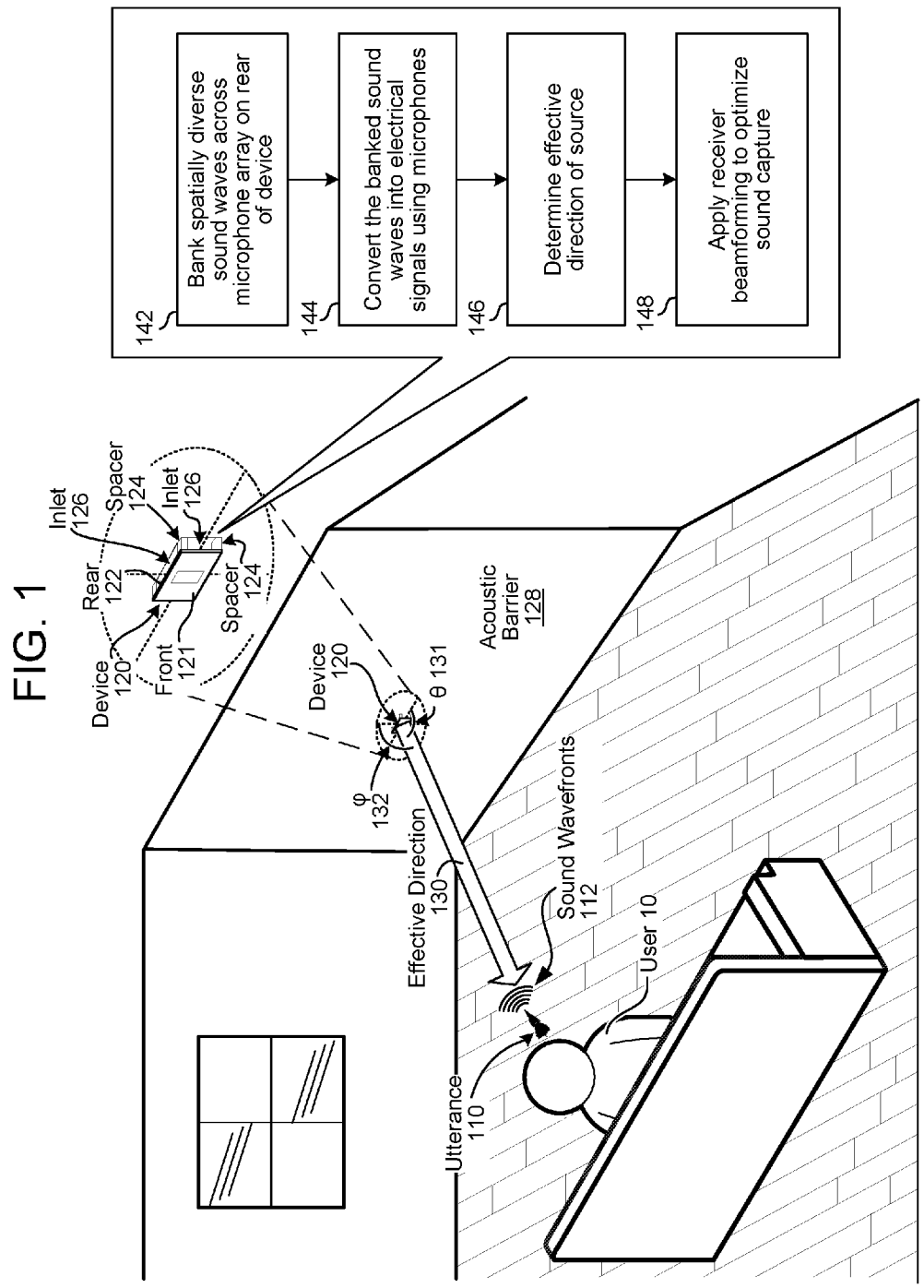
FIG. 1 illustrates an audio system where incident sound is banked across a microphone array behind a device, with beamforming applied to spatially filter the sound.

The features in the drawings are not necessarily drawn to scale unless expressly stated otherwise.

DETAILED DESCRIPTION

In general, a conventional acoustic reception beamforming systems are designed based on an assumption that incident sound waves will propagate in a direct line-of-sight from the source to the microphone array without any reflections, as the signal processing used assumes that the sounds propagate in a free field. Free-field propagation refers to an idealized environment where the microphone array is floating in a large empty space, such that there are no reflections of sound within the space and no other sources of vibrations. To receive sound in this manner, surface area facing the sound source may be dedicated to the microphone array. In some devices, such as thin displays with narrow bezels, or devices which otherwise have limited free surface area, it may therefore be impractical to include a microphone array.

Microphone beamforming or spatial filtering is a signal processing technique used with microphone arrays for directional signal reception. This is achieved by combining microphone elements in a phased array in such a way that signals at particular angles experience constructive interference while others experience destructive interference. Microphone beamforming can be used in order to achieve spatial selectivity, for example boosting audio from a desired direction and/or dampening audio from an undesired location. Voice-controlled devices may benefit from beamforming by spatially selecting a spoken utterance and occluding ambient noises originating elsewhere.

FIG. 1 illustrates an example of a system for spatially filtering sound that is banked laterally over an array of microphones arranged on a rear surface 122 of a device 120. Sound wavefronts 112 of a sound wave (e.g., utterance 110) propagate through space to enter inlets 126 along the sides of the device 120 from different directions, to propagate through a duct (226 in FIGS. 2B and 2C) at the rear of the device, where the microphones of the microphone array are arranged across an inside surface of the duct. An effective direction 130 relative to a front 121 of the device 120 from which the banked sounds (e.g., wavefronts 112 created by utterance 110) originated is determined by processing the sound waves as received by the microphone array. Based on the determined effective direction 130, the device 120 applies beamforming to isolate the received sound waves, selectively amplifying sound from and increasing the signal-to-noise of the source (e.g., user 10) and selectively occluding sounds from other sources.

In physics, a "wavefront" is the locus of points characterized by propagation of position of the same phase: a propagation of a line in one dimension, a curve in two dimensions, or a surface for a wave in three dimensions. Used herein for this conventional meaning, the "sound wavefronts" represent the propagation of the sound waves (e.g., corresponding to a sound such as the utterance 110) in three-dimensional space, where a phase of the sound wave is the same across a wavefront.

As used herein "bank," "banked," and "banking" includes turns in directions (e.g., horizontal, vertical, diagonal, etc.). The sound is "banked" because in normal operation there is no direct path of incidence from the sound source to the microphone array, such that the changes in the direction of propagation provided by acoustic reflections, diffracting, and spreading are consequential to propagating the wavefronts across the microphone array.

In the example illustrated in FIG. 1, sound waves may be reflected off of various surfaces toward the inlets 126 at a rear 122 of the device 120. Diffraction and spreading of the sound waves around the edges/corners of the device 120 may also contribute to the sound waves banking to propagate through the inlets 126. The rear surface of the device 120 and an acoustic barrier 128 (which in FIG. 1 is a wall) form a duct (226 in FIGS. 2B and 2C) through which the sound waves travel laterally across the rear surface 122 of the device 120. For example, spacers 124 may separate a rear 122 of the device 120 from the barrier 128, thereby providing the inlets 126 via which the sound waves propagate across a rear face 122 of the device 120. Instead of a wall or other structure, the acoustic barrier 128 may also be part of the structure of the device 120. Each "inlet" 126 may be a gap, a port, an opening into a duct, or any other space that sound may propagate without being obstructed by a component of the device 120.

The spatially diverse sound waves 112 are banked (142) across the microphone array arranged across a rear of the device 120. The microphones, which face the barrier 128, convert (144) the banked sound waves into electrical signals. Spatial filtering is applied (146) to the signals to determine the effective direction 130 of the common source of the sound waves (e.g., utterance 110 from user 10). As will be described further below in connection with FIGS. 4 and 6B, the direction is determined by applying a plurality of spatial filter directional models to the signals output by the microphone array, where each model is associated with a different effective direction. Each model comprises a plurality of weight values, where each microphone signal is associated with a specific weight value of the plurality of weight values. The spatial filter applies the weights to each microphone signal, where a weight may attenuate or boost the magnitude of the individual microphone signal. The weighted signals from all of the microphones are thereafter combined, The effective direction 130 is determined to be that direction associated with the model that produces a peak magnitude in the combined weighted signal.

The effective direction 130 may be a two-dimensional direction, such as a horizontal angle θ ("theta") 131 of incidence (e.g., between 0 to 180°) relative to the front face 121 of the device 120, or may be a three-dimensional direction, such as the horizontal angle θ 131 and a vertical angle φ ("phi") 132 of incidence (e.g., between to 45 to 135°). Beamforming is then applied (148) to achieve spatial selectivity, based on the effective direction 130. Among other advantages, spatial selectivity improves the signal-to-noise ratio of the sound as captured by the microphones 242 of the device 120.

Figure 2A:
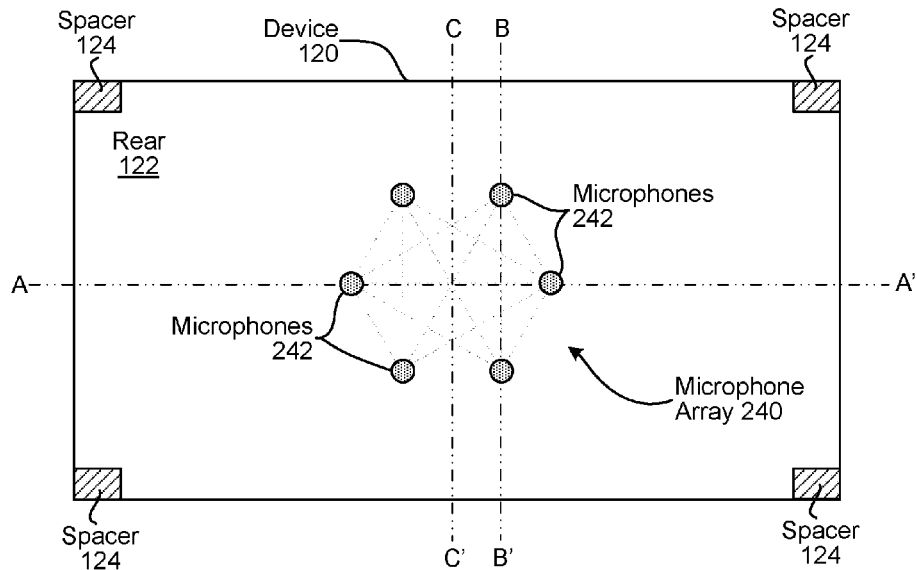
FIG. 2A illustrates the microphone array arranged across the rear of the device.
Figure 2B:
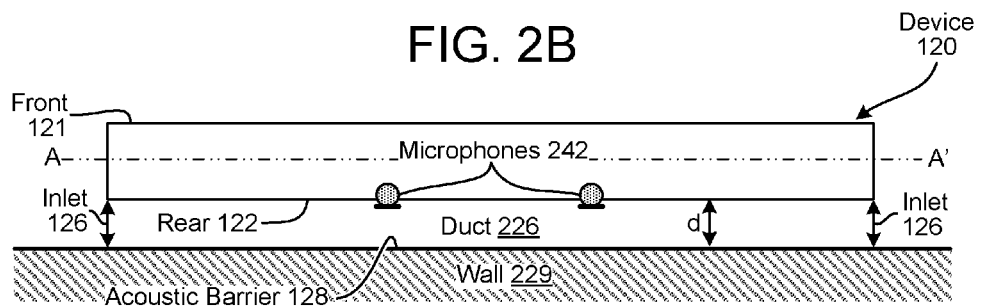
FIG. 2B illustrates an overhead cross-section of the device and an adjacent acoustic barrier, along the axis A-A' in FIG. 2A.
Figure 2C:
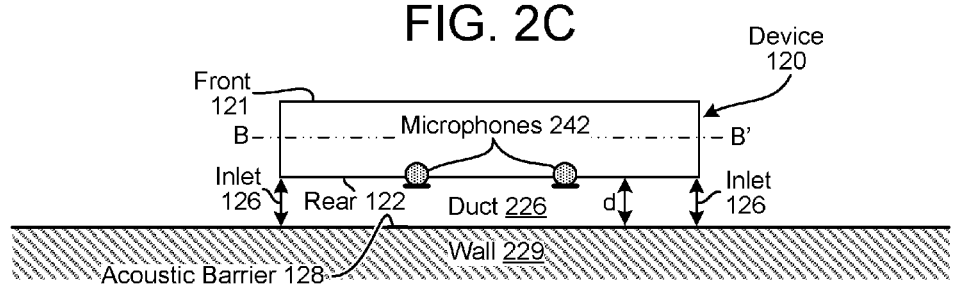
FIG. 2C illustrates a lateral cross-section of the device and the adjacent acoustic barrier, along the axis B-B' in FIG. 2A.

FIG. 2A illustrates a plurality of microphone 242 arranged as the microphone array 240 across the rear 122 of the device 120. FIG. 2B illustrates an overhead cross-section of the device 120 and the adjacent acoustic barrier 128, along the axis A-A' in FIG. 2A. FIG. 2C illustrates a lateral cross-section of the device 120 and the adjacent acoustic barrier 128, along the axis B-B' in FIG. 2A. As illustrated, the microphone array 240 is arranged in a plane forming one surface of the duct 226 (i.e., rear surface 122 of the device 120), where the acoustic barrier 128 (e.g., wall 229) is parallel to the plane and forms the opposite side of the duct 226. A center axis of each microphone 242 is orthogonal to the rear surface 122 of the device and the acoustic barrier 128 (i.e., the plane that forms the opposite side of the duct 226), and are substantially orthogonal to the direction in which sound propagates in the duct 226. The "duct" 226 is the air gap between the rear 122 of the device 120 and the acoustic barrier 128, which is open to the ambient environment on at least one side (an opening such as inlet 126). Sound enters the duct 226 via the inlets 126 arranged around the sides of the device. As illustrated in FIG. 2B, the inlets 126 are orthogonal to the parallel surfaces forming the duct 226 (e.g., the rear surface 122 and the acoustic barrier 128), although as will be discussed below, other arrangements are possible.

Figure 3A:
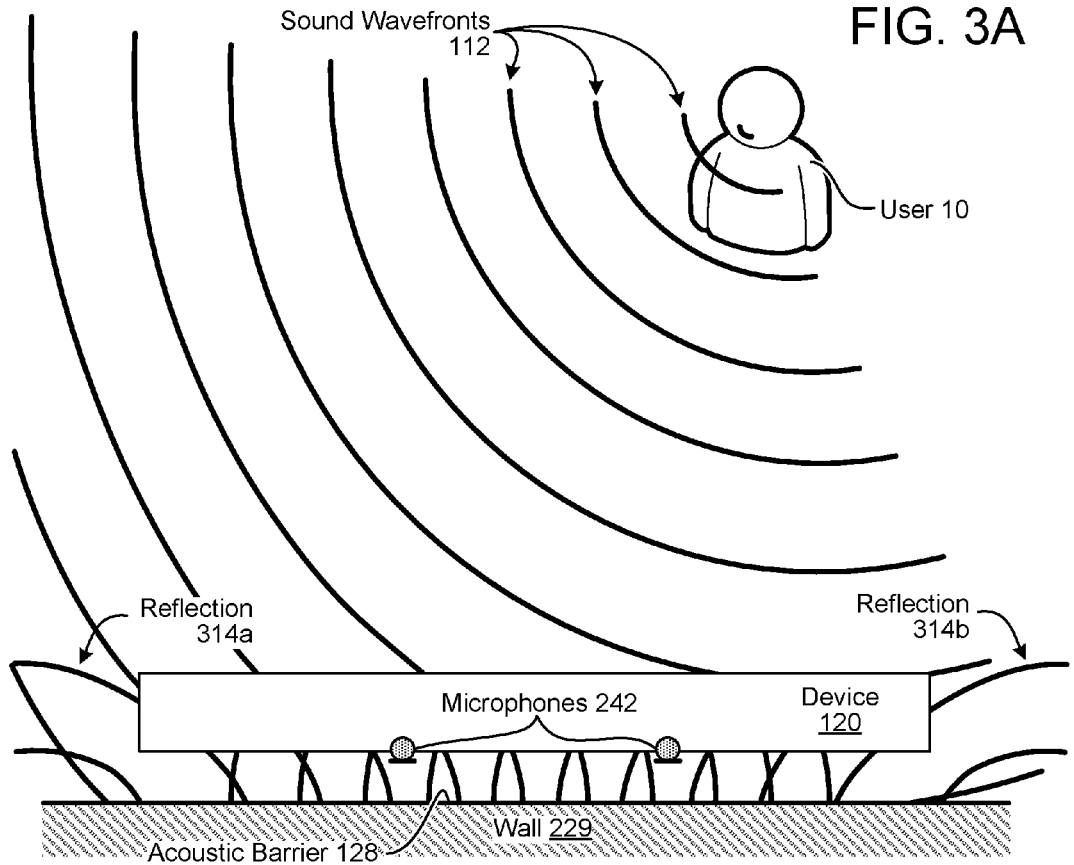
FIGS. 3A and 3B illustrate banked sound wavefronts propagating from different directions across the microphone array through a duct.
Figure 3B:
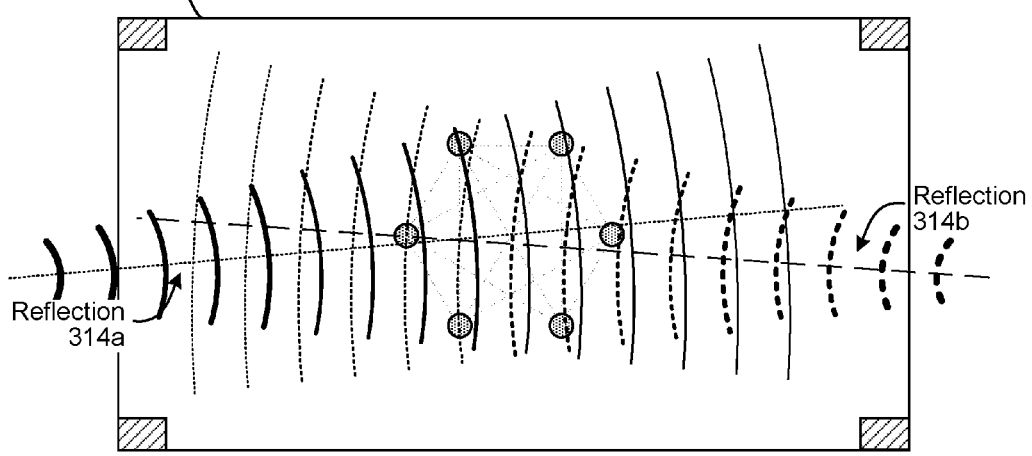

FIGS. 3A and 3B illustrate propagation of sound wavefronts 112, where banked wavefront reflections 314a and 314b propagate from different directions through the duct 226 and across the microphone array 240. The path of each sound wave/wavefront 112 across the microphone array 240 within the duct 226 is in directions that are substantially parallel to the rear surface 122 across which the array 240 is arranged/distributed. The microphone array 240 serves as a phased array, as the banked wavefront reflections 314a and 314b propagate across the microphones 242 out of phase. The concept of "phased arrays" originated in antenna theory, where an array of antennas selectively capture electromagnetic waves coming from a certain direction by using construction and destruction of the combined waves as received at each antenna. This concept has been applied to sound waves captured by an array of microphones in order to capture a sound coming from a certain direction while ignoring other less significant sources, such as those emanating from other directions. As a result of the pattern of constructive and destructive interference of the sound waves approaching a microphone from different directions, the microphone will generate a signal specific to that microphone. Thus, the signal generated by each of the microphones 242 will be unique in comparison to the interaction of the same sound waves at other microphones of the array, based on the relative phase of each of each sound wave at a respective microphone.

In FIGS. 3A and 3B, the sound wavefronts 112 and reflected sound wavefronts 314a and 314b represent points in the propagation of the sound waves having a same phase. Varying degrees of constructive and destructive interference may occur depending upon the interaction of the waves at an individual microphone, and the relative magnitudes (e.g., amplitudes) of the waves. For example, where the reflected wavefronts 314a and 314b coincide over a microphone, constructive interference may occur at that microphone. As another example, where a wavefront of one reflection (e.g., 314a) coincides with a trough of another reflection (e.g., the middle of the space between wavefronts 314b), destructive interference may occur.

The curvature of the sound wavefronts 112 and wavefront reflections 314a/314b in FIG. 3A are exaggerated. If FIG. 3A the user 10 is further away from the device 120, the wavefronts 112/314 would be closer to straight lines (as illustrated in two dimensions) than the illustrated arcs which is a more accurate representation when the sound source is very near device 120. Also, in FIG. 3B, the banked wavefront reflections 314a and 314b are illustrated as though emanating from discrete points. This simplification is intended to demonstrate basic principles of operation of the device 120. In practice, the reflections 314 and other banked-wavefront sources (e.g., diffraction and geometric spreading) may produce more wavefronts, including wavefronts emanating from multiple directions. Constructive and destructive interference due to interactions between the banked wavefronts 314 may also occur, as may standing waves within the duct 226 (discussed further below).

Based on the banked sound waves propagating laterally over the microphone array 240 on a rear of the device, the device 120 may perform beamforming to isolate sound originating in the effective direction 130 of the source of the sound (e.g., utterance 110). To achieve spatial selectivity for beamforming, the device 120 may determine the reception angle/azimuth (e.g., θ 131 and φ 132) and peak magnitude of an effective reception direction 130 at one or more frequencies, based on the microphone signal data resulting from the propagation of the banked wavefronts 314 across the microphone array 240.

Figure 4:
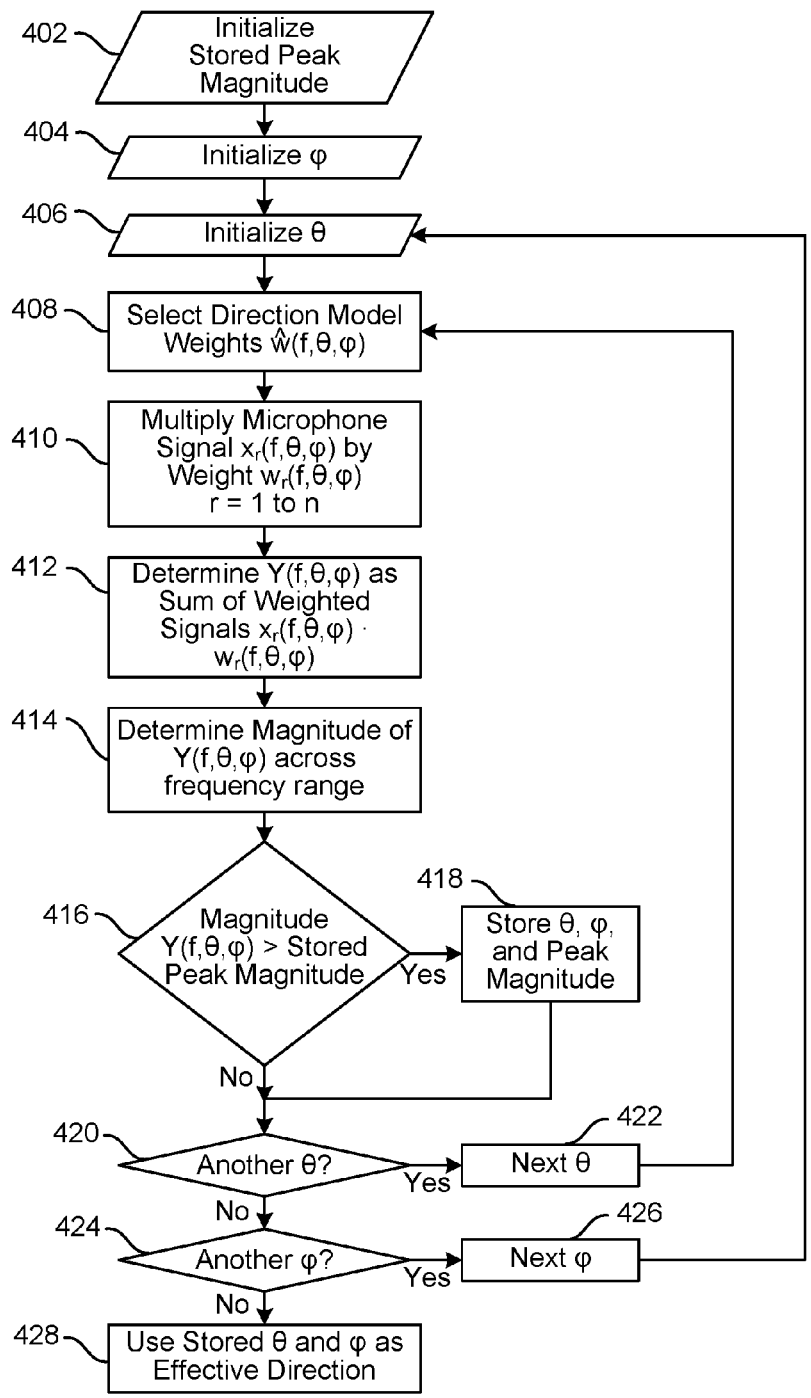
FIG. 4 illustrates an example process for sweeping a beam pattern across a range of vertical and horizontal directions to determine an effective direction of an origin of a sound relative to a front of the device.

FIG. 4 is a process flow illustrating examples of steps that may be performed to determine the effective reception direction 130 by sweeping through a range of horizontal angles θ 131 and a range of vertical angles φ 132. The process begins by initializing (402) a stored peak magnitude (e.g., to zero), initializing (404) the vertical angle φ 132 (e.g., to a beginning or an end of a vertical range such as 45 to 135 degrees relative to a front 121 of the device 120), and initializing (406) a horizontal angle θ 131 (e.g., to a beginning or an end of a horizontal range such as 0 to 180 degrees relative to a front 121 of the device 120).

Based on the current angles θ and φ, a direction model associated with the angles is selected (408). Each angle-dependent direction model includes a plurality of frequency dependent weights $\hat{w}(f, θ, φ)$ composed of weights $wr(f,θ,φ)$, where r=1 to n, and n equals the total number of microphones 242 in the microphone array 240. Each model may include weights for a plurality of frequencies, such as a different set of weights for a range of frequencies from 80 Hz to 6 kHz in steps of 20 Hz (e.g., a set of weights for 80 Hz, a set of weights for 100 Hz, a set of weights for 120 Hz, etc.). Although linear steps of 20 Hz are used in this example, steps sizes may be non-linear, such as an arrangement where the step sizes between frequencies at the low end of the range are smaller than the step sizes between frequencies at the high end of the range.

Each weight $wr(f,θ,φ)$ corresponds to a microphone signal xr from one of the microphones 242a to 242n. A spatial filtering transform is applied to each microphone signal xr by multiplying (410) xr by each of the frequency dependent weights $wr(f,θ,φ)$. All of the products $xr·wr(f,θ,φ)$ are added (412) together to produce a signal $Y(f,θ,φ)$, and a magnitude of $Y(f,θ,φ)$ is determined (414) across the frequency range (i.e., the frequency range of the applied weights). The magnitude may be, for example, that largest magnitude of Y at any of the frequencies across the frequency range.

The determined magnitude is then compared (416) to the stored peak magnitude. If the determined magnitude is larger than the stored peak magnitude (416 "Yes"), the angles θ and φ are stored (418), replacing any previously stored angles, and the current determined magnitude is stored (418) as the new peak magnitude. After storing the angles and magnitude, or if the current magnitude is not larger than the stored peak magnitude (416 "No"), a determination (420) is made as to whether there is another horizontal angle θ 131 to test at the current vertical angle φ 132. The horizontal angles θ 131 across a range (e.g., 0 to 180 degrees), may be in discrete steps such as of 10 degrees. The vertical angles φ 132 across a range (e.g., 45 to 135 degrees), may be in discrete steps such as of 15 degrees.

If there is another angle in the horizontal range (420 "Yes"), a next horizontal angle θ is selected (422), such as incrementing or decrementing the previous horizontal angle by 10 degrees. Another direction model is then selected (408) based on the updated horizontal angle 131 and the process repeats to apply the weights of the model corresponding to current angles. Otherwise (420 "No"), a determination (424) is made as to whether there is another vertical angle φ 132 to test.

If there is another vertical angle φ 132 in the vertical range (424 "Yes"), a next vertical angle φ is selected (426), such as incrementing or decrementing the previous vertical angle by 15 degrees. The horizontal angle θ is reinitialized (406) to the beginning or the end of horizontal range (e.g., 0 to 180 degrees), and the process repeats to apply the weights of the model corresponding to current angles. After all the angles have been swept through (420 "No" and 424 "No"), the stored angles θ and φ (from 418) corresponding to peak magnitude may be used as the effective direction 130.

Figure 5A:
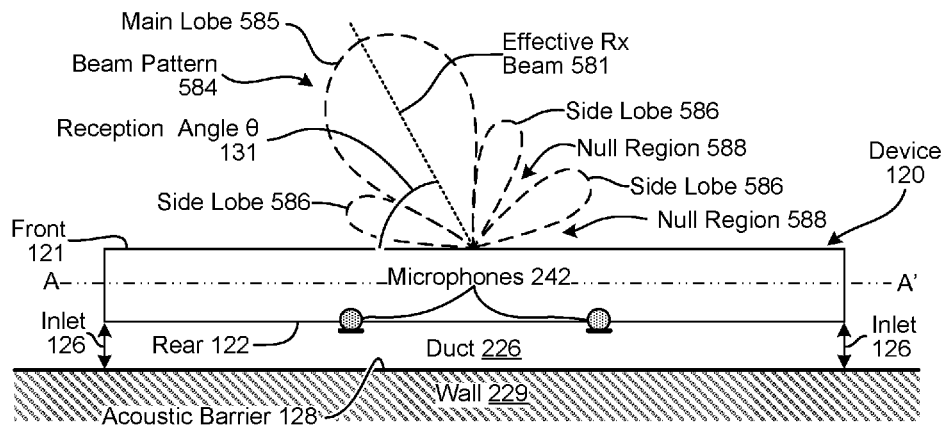
FIGS. 5A and 5B each illustrate a beamforming beam pattern in two dimensions.
Figure 5B:
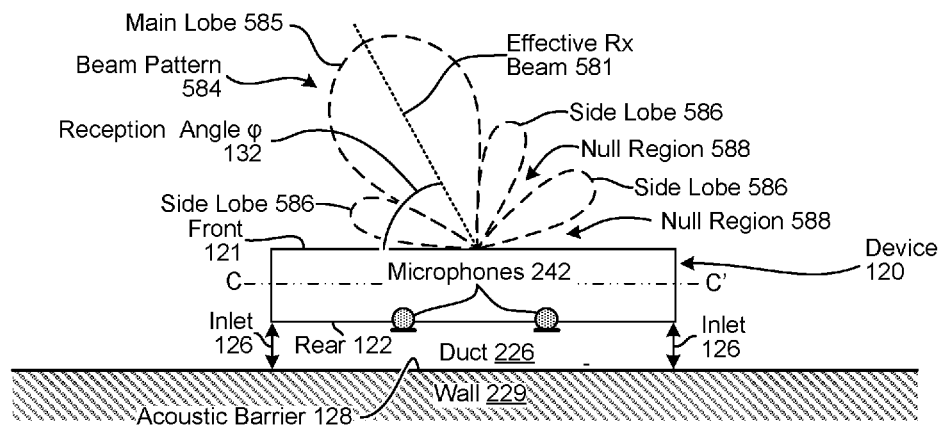

Referring to FIGS. 5A and 5B, the beam former/spatial filter sweeps a beam pattern 584 across a range of reception angles θ and φ by applying beamforming coefficients to signal data acquired from a microphone array 240. FIG. 5A illustrates a lateral cross-section of the device 120 along the axis A-A' in FIG. 2A. FIG. 5B illustrates a lateral cross-section of the device 120 along the axis C-C' in FIG. 2A. The beam pattern 584 generates directions of effective gain or attenuation. As illustrated, the dashed line of the beam pattern 584 indicates idealized isometric lines of gain provided by the beamforming coefficients (i.e., the weights) $\hat{w}(f,θ,φ)$. For example, the gain at the dashed line may be +12 decibels (dB) relative to an isotropic microphone.

The beam pattern 584 may exhibit a plurality of lobes, or regions of gain, with gain predominating in a particular direction designated the effective reception (Rx) direction 581, corresponding to the effective source direction 130. The beam pattern 584 may exhibit a plurality of lobes, or regions of gain, with gain predominating in a particular direction. A main lobe 585 extends along the direction of the effective beam 581. In this example, the beam pattern 584 also includes side lobes 586. Disposed around the beam pattern 584 are null regions 588. These null regions are areas of attenuation for signals received from directions coinciding with a null region 588. The relative size and shape of the lobes 485 and 486 and the null regions 488 are idealized. In practice, the lobes may, for example, be less distinct, with less defined null regions.

The form factor of the device 120 may be thin (front 121 to rear 122) relative to other dimensions (e.g., width and height). The microphone array 240 may be inside the device, either inset from or flush with the 122 rear surface 122. However, since the device 120 may be thin, the microphone array 240 may instead extend/project outward from the rear surface 122. The spacing between microphones 242 may be, for example 20 mm and each of the microphone are omnidirectional. The center axis of each microphone 242 is substantially orthogonal to the direction in which the soundwaves propagate in the duct 226, such that the microphones face toward the acoustic barrier 128. The improvement in signal-to-noise ratio (SNR) corresponds in part to the number of microphones 242 in the array 240, with performance improving as the number of microphones increase. As a practical matter, the minimum number of microphones in the array 240 is four, with the +12 dB improvement corresponding to four microphones. With only two microphones operating in the horizontal direction, the improvement was only around +5-6 dB. Preferably, the array 240 includes at least six microphones 242.

The beamformer (668 in FIG. 5) applies beamforming coefficients to the signals from each microphone, amplifying or attenuating the signals by different "weights" to produce a spatially filtered output signal. Different weighting patterns (e.g., based on a Dolph-Chebyshev window function) may be used to achieve particular beam sensitivity patterns 584. The spatial filter mathematically "sweeps" the beam pattern 584 across the range of angles and determines the received signal magnitude at each angle. The angle θ (or angles θ and φ corresponding to the peak magnitude indicates the effective source direction 130. Thus, the effective reception (Rx) beam 581 exhibiting a largest magnitude in terms of maximizing reception of the target sound (e.g., utterance 110) corresponds to the effective source direction 130.

In the illustrated example, utterances 110 of the user 10 originating within the main lobe 585 benefit from the selective gain provided by the beam pattern 584, resulting in an improved signal-to-noise ratio (SNR) compared to sounds captured without beamforming. For example, if a background sound originates in a direction coinciding with a null region 588, the resulting contribution of the background sound to the filtered signal may be significantly reduced. Beamforming also allows for spatial selectivity, effectively allowing the system to "turn a deaf ear" on a sound which is not of interest. This is advantageous if the device 120 is accepting speech-based commands from the user 10, as it improves the accuracy of speech recognition processing. Similarly, if the captured sound is being transmitted elsewhere as part of a teleconference, the transmitted sound will benefit from containing less noise.

A principle of beamforming is the assumption that a target sound is coming from one direction (e.g., effective sound direction 130), and that noise is coming from other directions. By using spatial filtering, the noises can be suppressed in an output audio signal derived from sounds captured by the microphone array 240. This improves the signal-to-noise ratio in the output audio signal. However, in an ordinarily beamforming system, the microphones used for beamforming would be in a direct line-of-sight of the sound source, or at least there would be no obstruction between the sound source and the microphones.

In comparison, as illustrated in FIGS. 1 to 3B, 5A, and 5B, the microphones 242 are obstructed by the device 120 itself, facing away from the sound source (e.g., user 10). However, incident sound waves are not occluded, and are instead banked (e.g., 314a, 314b) from multiple direction through inlets 126 into the duct 226 between the microphone array 240 and the acoustic barrier 128. The different phase relationships between the banked wavefronts (e.g., 314a and 314b in FIGS. 3A, 3B) are reproduced by the signals generated by the microphones, which depend in part on the paths of propagation of the banked sounds. Among other things, paths of propagation vary based on the directions from which the banked wavefronts enter the duct 226 and the distance traveled to reach the position of an individual microphone 242.

So, for example, wavefronts of a sound wave reflecting off of the floor may exhibit a certain phase at a microphone, whereas a sound wave reflecting off the ceiling might have a different phase relationship with the same microphone. With the device 120, the spacing between each microphone 242 in array 240 is known. By accounting for the distance between microphones and aligning the phase of signals between microphones, an effective direction 130 from which the sound waves originally emanated may be determined.

After a sound wave enters the duct 226, the magnitude of the sound wave as received by each microphone will also depend upon the direction of propagation of the sound wave within the duct 226. Ignoring the effect of constructive and destructive interference between banked wavefronts within the duct 226, a banked sound wave will have a greater magnitude at the first microphone it is incident upon than the last. To some extent, the inlets 126 act as directional filters, with some wavelength filtering occurring due to the physical dimensions of the inlets 126.

If two sound waves from a same source enter the duct 226 from different directions, the wavefronts of the two waves (e.g., 314a, 314b) may be out of phase with each other and exhibit a different time-difference-of-arrival (TDOA) across the array 240. Based on differences between signals output by each microphone 242 of the array in response to the combined wavefronts, the effective direction 130 from which the sounds originate may be determined in two or three dimensions.

Conventional beamforming techniques may not work with sound channeled through the duct 226 because the assumption of a free acoustic field is broken. Specifically, the waves are not directly impinging on each microphone 242, but rather are banked to the microphone by the duct 226, which acts as a wave guide.

The acoustic propagation properties of the duct may be modelled to discriminate between sounds originating from different directions. An adaptive filter may be trained to build adaptive models able to discriminate between sounds originating in different effective directions, such as neural-network based models. For example, a first model of how the array 240 responds may be determined for a sound wave originating from a first effective direction, and a second model may be determined for a sound wave originating from a second effective direction. The sounds used for training may be of a particular frequency or a range of frequencies, and different frequencies may be used in succession for the different effective directions. If all possible directions are of interest, sounds may be played from the full range of directions to train the system, producing a comprehensive set of models.

Due to variation in room acoustics and the acoustic reflectivity of surfaces in the room, the effective direction 130 from which sound originated may not be the actual direction. For example, referring to FIG. 1, due to room acoustics the effective direction may point to the left or to the right of the user 10. However, since the purpose of determining the effective direction 130 is spatial filtering, the device 120 does not need to determine the actual location of the user to isolate sounds and occlude noise. What matters is to direct the main lobe 585 of the beam pattern 584 in such a way as to maximize the gain applied to the sound (e.g., utterance 110). However, when the adaptive filter is trained, the angles provided as the source direction are the true angles, indicating the actual position of the origin of the source of the training sounds/tones relative to a front 121 of the device 120.

Variable factors may be taken into consideration when training the device 120 (i.e., building the models), in addition to the direction of the sounds. Such factors include the dimensions of the inlets 126, the directions of the inlets relative to the microphone array 240, the acoustic properties of any inner lining materials, the number and arrangement of microphones 242 in the array 240, and frequency propagation properties of the duct 226.

Figure 6A:
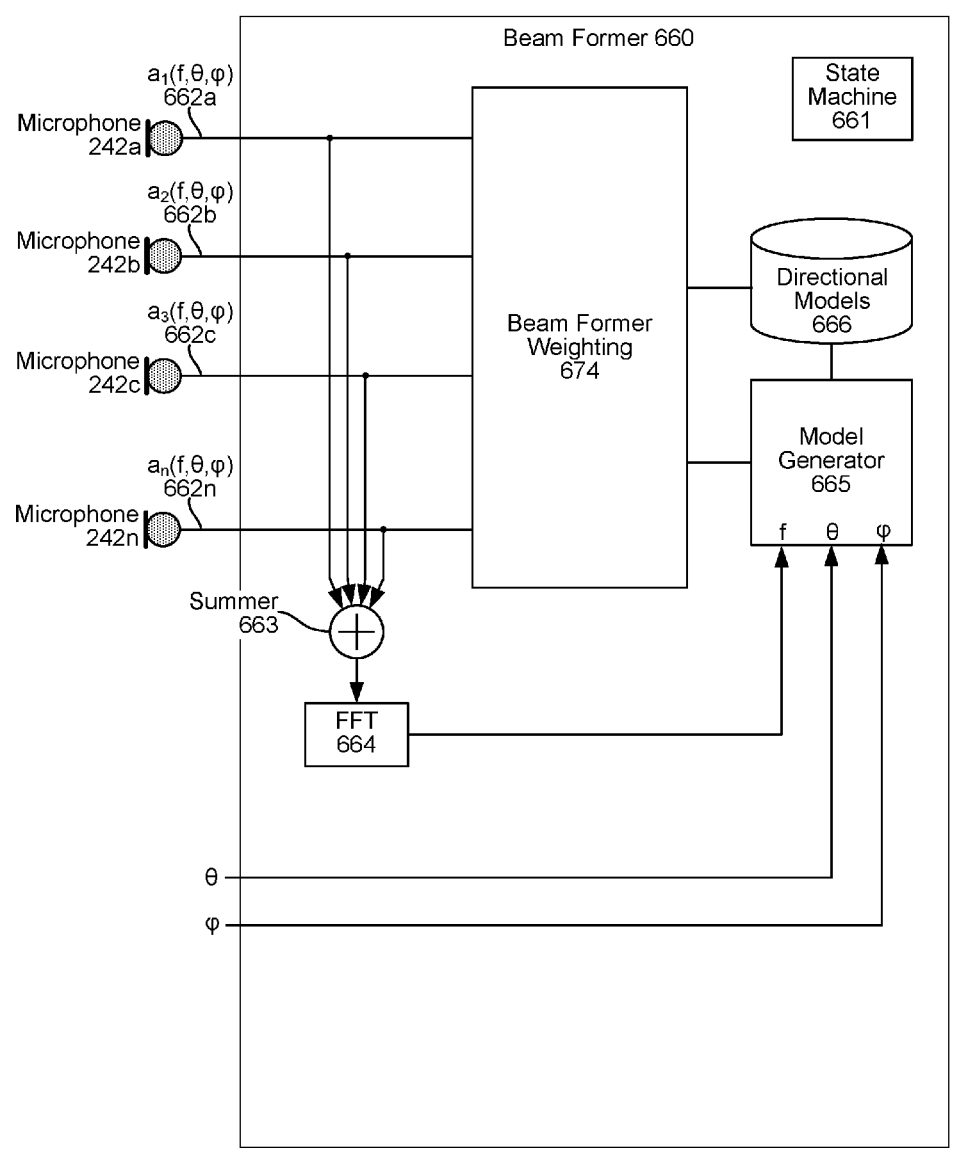
FIGS. 6A to 6C illustrate components and processes of the beamformer.
Figure 6B:
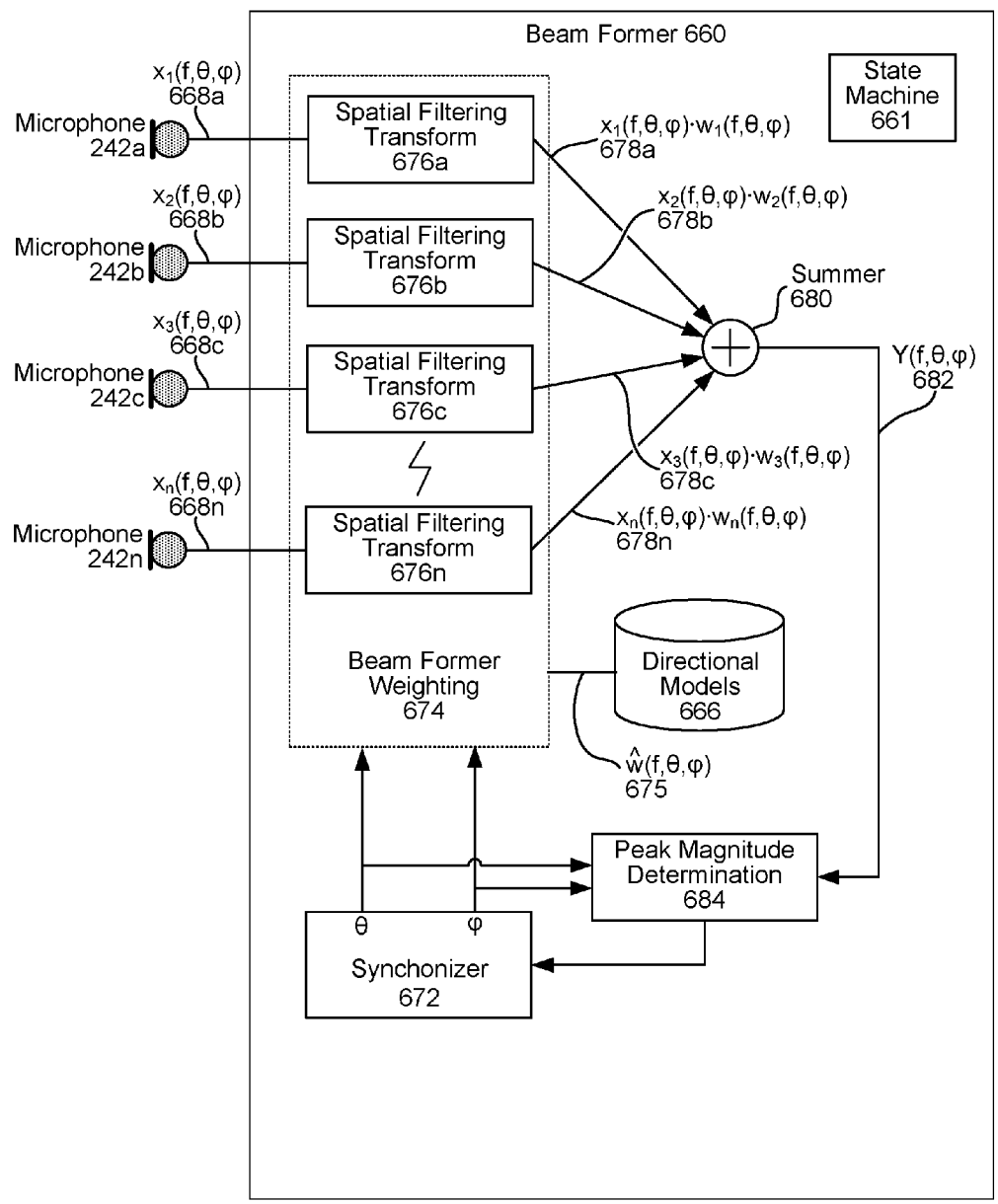
Figure 6C:
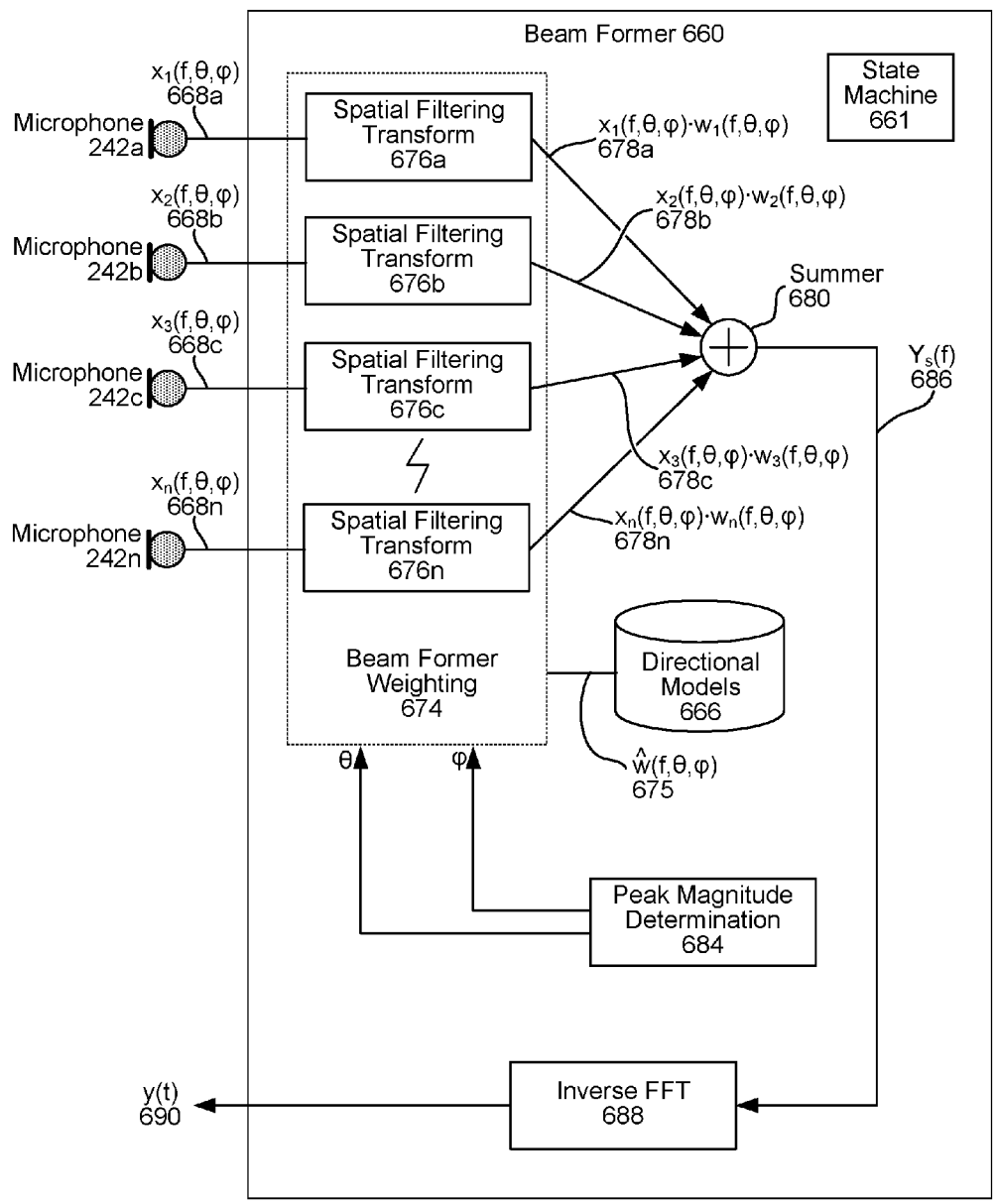

FIGS. 6A to 6C illustrate operations of the beam former 660. A controller such as state machine 661 or a corresponding processor-implemented control process configures the beam former 660 for different modes of operation. In FIG. 6A, the beam former 660 operates in a training mode in which the directional models are built. In FIG. 6B, after a sound of interest is detected, the beam former 660 operates in a scanning mode to determine the effective direction 130 of the origin of the sound. The sound of interest may be, for example, a sound that a speech detector (not illustrated) determines might be speech. Once the directional models are developed, a spatial filtering transform is applied to the output of each of the microphones 242, where the output of the transform depends upon the effective direction 130 of the sound. In FIG. 6C, after the effective direction 130 has been determined, the beam former 660 operates as a spatial filter to improve the signal-to-noise ratio of the sound as captured by the microphones 242 of the device 120.

Referring to FIG. 6A, the microphone signals are modeled through the array manifold vector:

$$\hat{a}(f, \theta, \varphi) = \begin{bmatrix} a_1(f, \theta, \varphi) \\ a_2(f, \theta, \varphi) \\ a_3(f, \theta, \varphi) \\ \ldots \\ a_n(f, \theta, \varphi) \end{bmatrix} \quad [1]$$

where "n" denotes the number of microphones in the array, "f" denotes the frequency of the incoming sound, angle theta (θ) 131 is the horizontal arrival angle, and the angle phi (φ) 132 is the vertical arrival angle.

In training mode, the audio signals $a_1(f, \theta, \phi)$ 662a to $a_n(f, \theta, \phi)$ 662n output by the microphones 242a to 242n in response to training sounds are input into beam former weighting 674, which comprises an adaptive filter. The angles θ, φ of the actual direction of the source of the training sounds are input into a model generator 665 that configures the weights of the adaptive filters so that acoustic pattern exhibited by the signals from the microphone array 240 are associated with the direction. The models are frequency-specific, such that for each of the directions, a plurality of direction models (stored in 666) are constructed. The frequency/frequencies of the training sounds/tones may be input into the beam former 660 during training, or the audio signals $a_1(f, \theta, \phi)$ 662a to $a_n(f, \theta, \phi)$ 662n may be input into a summer 663, with a time-domain-to-frequency-domain transform applied (e.g., by Fast Fourier Transform (FFT) in block 664) to the output of the summer 663 to determine the frequency components of the training sounds/tones.

In FIG. 6B, after the adaptive filter has been trained to construct the directional models, the beam former 660 is configured to determine the effective direction 130 of received sounds. Microphones 242a to 242n of the microphone array 240 output a plurality of signals $x_1(f, \theta, \phi)$ 668a to $x_n(f, \theta, \phi)$ 668n. The true microphone signals 668a to 668n are denoted by the vector x:

$$x(f, \theta, \varphi) = \begin{bmatrix} x_1(f, \theta, \varphi) \\ x_2(f, \theta, \varphi) \\ x_3(f, \theta, \varphi) \\ \ldots \\ x_n(f, \theta, \varphi) \end{bmatrix} \quad [2]$$

The beamformer 660 includes a plurality of spatial filter 567a to 567n. Each spatial filter 567a to 567n applies a spatial filtering transform to a signal 668a to 668n from a respective microphone 242a to 242n. These spatial filters 676a to 676n apply the weights determined using of the array manifold vector, and they are designed specific to the direction and frequency of the incoming sound. The spatial filters are represented in the frequency domain by the beamformer weight vector:

$$\hat{w}(f, \theta, \varphi) = \begin{bmatrix} w_1(f, \theta, \varphi) \\ w_2(f, \theta, \varphi) \\ w_3(f, \theta, \varphi) \\ \ldots \\ w_n(f, \theta, \varphi) \end{bmatrix} \quad [3]$$

The directional models 666 comprise a table of stored weights $\hat{w}(f, \theta, \phi)$ 675 which are used to determine the beam sensitivity pattern 584 (e.g., based on a Dolph-Chebyshev window function). The beamformer output for frequency "f" is obtained by doing an element-by-element multiplication of the weight w and the microphone signals x, and then summing the resultant:

$$Y(f,\theta,\phi) = \Sigma_{m=1}^{n} w_m(f,\theta,\phi) x_m(f,\theta,\phi) \quad [4]$$

where the value of "Y" is a magnitude calculated for each frequency point in a specified frequency range (e.g., 80 Hz to 6 Khz in discrete 20 Hz steps). Each spatial filtering transform outputs a frequency-domain signal $x_m(f, \theta, \phi) \cdot w_m(f, \theta, \phi)$ 678a to 678n (where m=1 to n) resulting from multiplying the microphone signal by the stored weights for that microphone in accordance with the directional model. The frequency domain signals are combined by summer 680, producing the combined signal $Y(f, \theta, \phi)$ 682 in accordance with Equation [4]. If operating in only two dimensions, frequency and a single angle may be used, such as using $\hat{a}(f,\theta)$ as the array manifold vector and an output value $Y(f,\theta)$.

To determine the effective direction 130, a synchronizer 672 sweeps across a range of reception horizontal angles θ (e.g., 0 to 180°) and vertical angles φ (e.g., 45 to 135°), applying beamforming coefficient weights 675 to signal data acquired from the microphone array 240. Referring to FIG. 4, the synchronizer 672 may manage initializing (404, 406) and stepping through (420 to 426) the ranges of angles. The angles may also be in discrete steps used during model building, such as discrete steps of 10° for θ and discrete steps of 15° for φ. A peak magnitude determination engine 684 receives the values of $Y(f,\theta,\phi)$ 682 as the synchronizer 672 sweeps through the angles, and determines a largest peak magnitude that corresponds to angles θ and φ of the effective direction 130. Referring to FIG. 4, the peak magnitude determination engine 684, in coordination with the synchronizer 672, initialize the peak magnitude 402, determines the magnitude of $Y(f, \theta, \phi)$ 682, determines (416) whether the magnitude is the is the largest magnitude, and updates (418) the stored values.

In FIG. 6C, after the synchronizer has swept the ranges of angles θ and φ and the peak magnitude determination engine 684 has determined the angles corresponding to the effective direction 130 based on the peak magnitude, the angles θ and φ are set to direct the effective reception beam 581 in the effective direction 130. With the angles θ and φ of the effective reception beam 581 fixed, the output of the summer 680 is a frequency domain signal Ys(f) 686 for the effective source direction 130. An inverse Fast Fourier Transform (FFT) 688 is performed on the values of Ys(f) 686 to determine a time-domain time-variant beamformer output signal y(t) 690, where f corresponds to the frequency steps of the directional models 666 across the specified frequency range (e.g., 80 Hz to 6 Khz in discrete 20 Hz steps). After the sound is no longer detected (e.g., utterance 110) for a specified duration, the state machine 661 may reset the angles of the effective direction 130, placing the beam former 660 into a standby mode until a new sound is detected (resuming operation as described in connection with FIG. 6B).

Figure 7A:
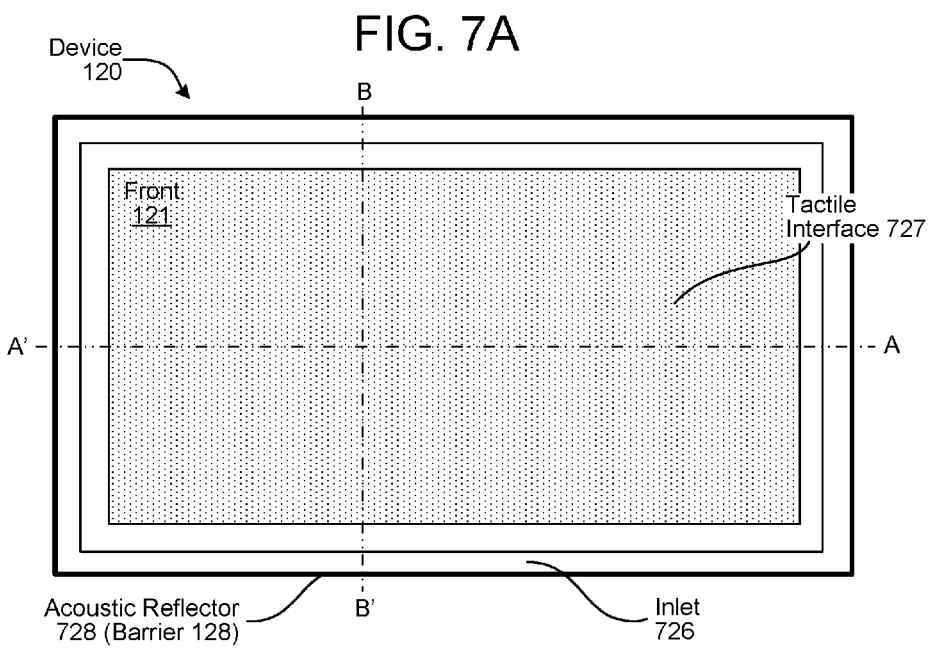
FIGS. 7A to 7C illustrate an acoustic reflector which directs/banks sound wavefronts into the duct.
Figure 7B:
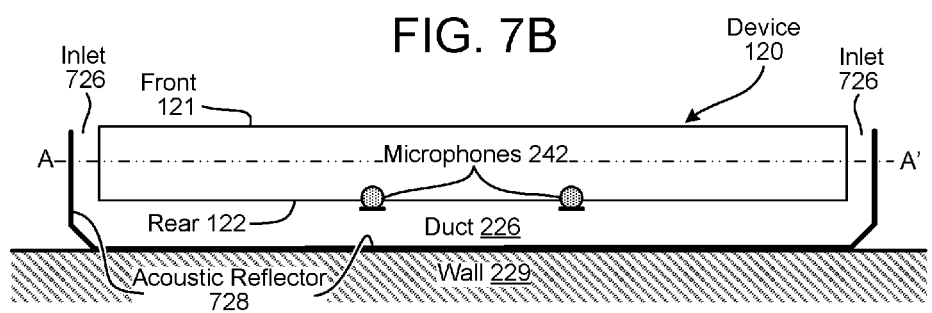
Figure 7C:
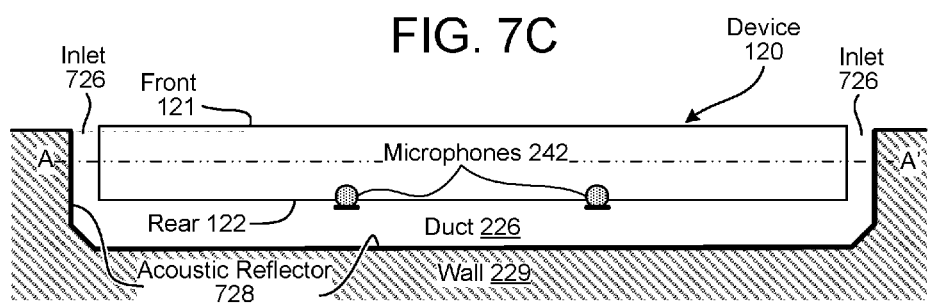

The acoustic barrier 128 may be part of the structure of the device 120. FIGS. 7A to 7C illustrate an example where an acoustic reflector 728 is mounted on the back of the device 120, providing the acoustic barrier 128. In FIG. 7B, the acoustic reflector 728 is mounted on a wall 229. In FIG. 7C, a front edge of the acoustic reflector 728 is flush with the wall 229. Intermediate arrangements where the acoustic reflector 728 is inset into the wall, but extends in-part in front of the wall, are also contemplated. The inlets 726 of the reflector 728 face forward (orthogonal to the duct 226). The acoustic reflector 728 directs incident sound into the duct 226. The reflector may have angled corners (as illustrate) or curves may be used to bank incident sound waves across the array 240.

The duct 226 acts as an acoustic cavity and waveguide and has at least one port 126/726, creating an air-filled space through which sound may propagate. In general, increasing the area and number of inlets 126/726 along the edges of the duct 226 will reduce internal surface reflections due to a wavefront propagating across the microphone array and then being reflected back across the array 240. To reduce reflections off the parallel surfaces of the cavity itself, which can create spatial aliasing within that cavity, the distance "d" from the rear surface 122 to the acoustic barrier 128 is preferable less-than-or equal to one-half the wavelength of the highest frequency of interest. For speech recognition, the frequency range of interest is typically 80 Hertz (Hz) to 6 kHz. Using a speed of sound of 340 m/s as an approximation of the speed of sound in dry air at 15-20° C. at sea level, the wavelength of 6 kHz is approximately 5.67 cm (i.e., 340 m/s divided by 6 kHz). Half of the wavelength is 2.83 cm, such that d<2.83 cm.

At some frequencies, standing waves can occur within the duct 226 (as a function of frequency). To suppress standing waves in the duct 226, the principles of design for anechoic chambers may be used to reduce or eliminate standing waves within the frequency range of interest. For example, acoustically-absorbent foam may be placed within the duct 226 to suppress the reflections and resonance that produces standing waves.

The frequencies suppressed are generally proportional to the size and shape of the foam. The size and shape of the foam obstacles may be irregular so as to suppress resonance across a range of wavelengths. For example, if a sound wave is 100 Hz, and the speed of sound is 340 meters-per-second (m/s), then the wavelength is 340 m/s divided by 100 Hz (cycles-per-second), which is 34 centimeters (cm). Since the cones are proportionate to the size of the wavelength to be suppressed, dampening standing waves at 100 Hz with conventional sound-dampening foam with 1:1 proportionality would ordinarily require a 34 cm cone, which is large for most devices. However, since dampening higher frequencies would use smaller cones, dampening higher frequency standing waves may be practical for many device form factors.

Figure 8A:
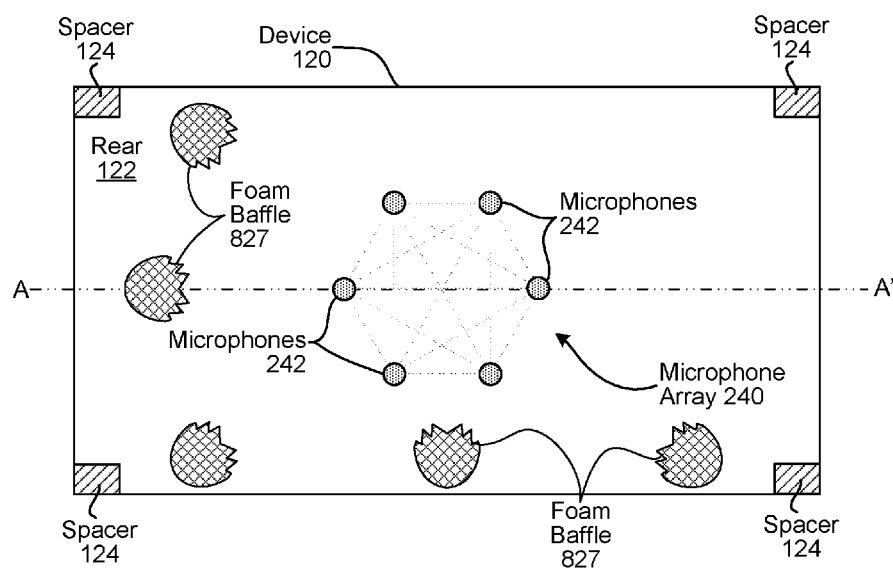
FIGS. 8A, 8B, 9, and 10 illustrate approaches to reducing standing waves in the duct.
Figure 8B:
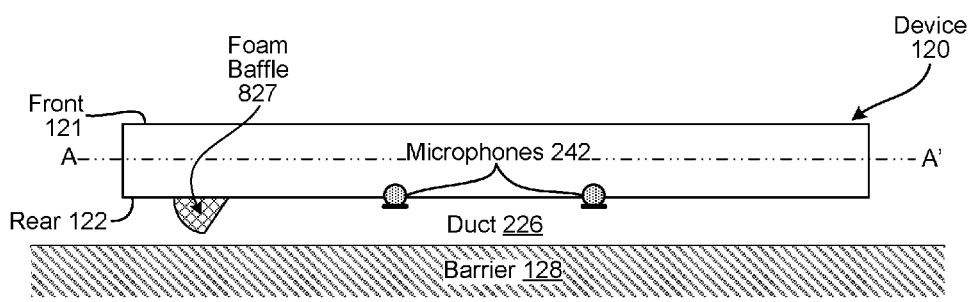

FIGS. 8A and 8B illustrate an example of foam baffles 827 arranged as irregularly shaped cones across the rear 122 of the device 120 to dampen standing waves. The acoustic foam used for the baffles may be an open-cell or closed-cell foam. As illustrated, the foam baffles 827 are irregularly shaped cones arranged in an asymmetric pattern across the rear 122 of the device to attenuate sounds propagating across the microphone array 240 from some directions but not others. The foam baffles 827 are arranged on the rear surface 122 of the device 120, but do not necessarily extend all the way to the acoustic barrier 128/reflector 728, so that some sound may propagate over the baffles 827. One or more surfaces of the baffles 827 may be pitched at one or more angles so as to mitigate reflecting sound back in the direction from which it was incident.

Figure 9:
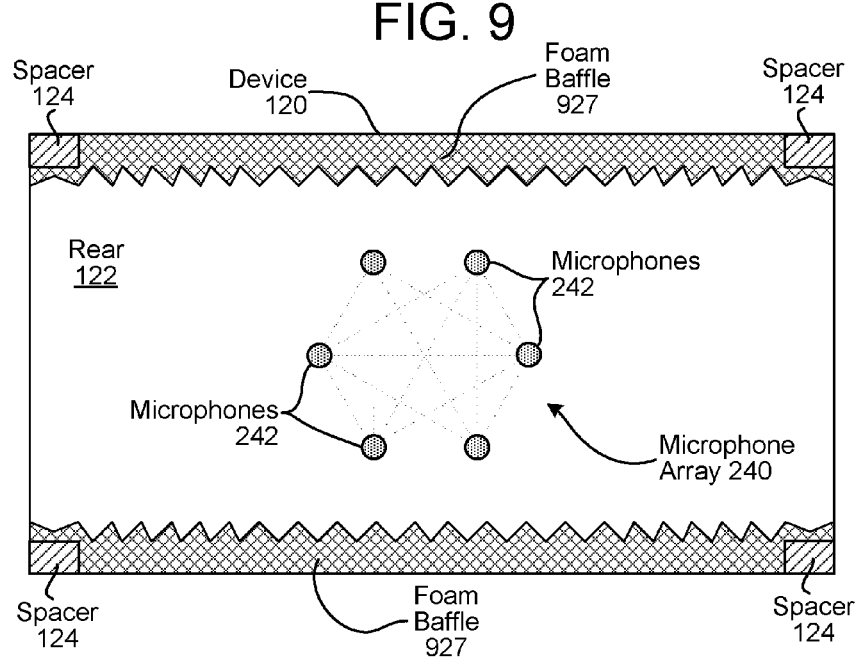
Figure 10:
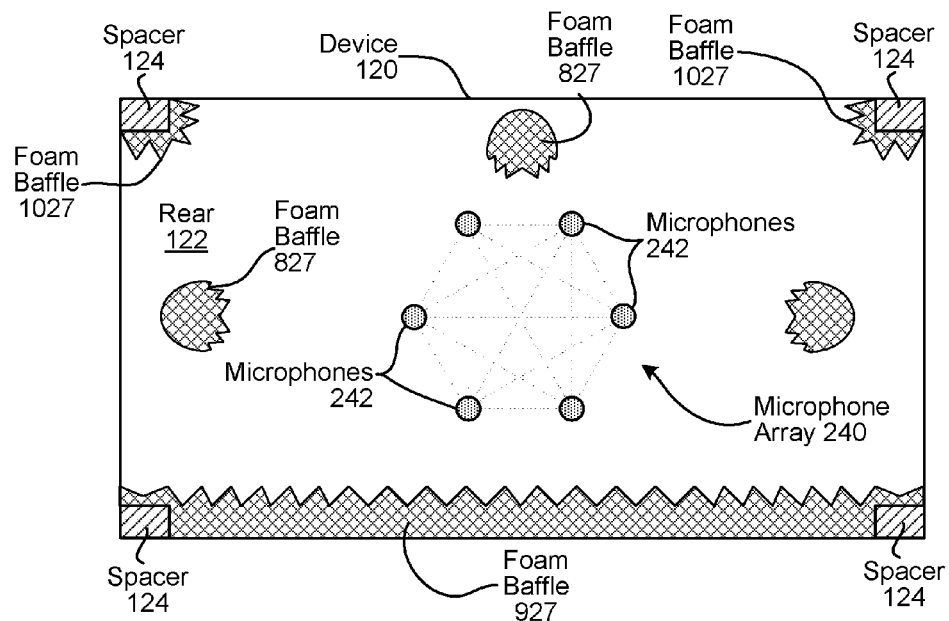

FIG. 9 illustrates an arrangement where foam baffles 927 close off two sides of the duct 226, such that only two port 126 are open. In this example, the baffles 927 may extend from the rear surface 122 all the way to the acoustic barrier 128/reflector 728, closing off propagation of sound from those directions. FIG. 10 illustrates a mix of foam baffles, including cones 827, an edge baffle 927 closing off the bottom port, and baffles 1027 surrounding exposed spacers 124 to reduce acoustic reflections off the spacers 124. The baffles 827/927/1027 may be strategically placed where needed, and what is shown is not necessarily the optimal placement.

Figure 11:
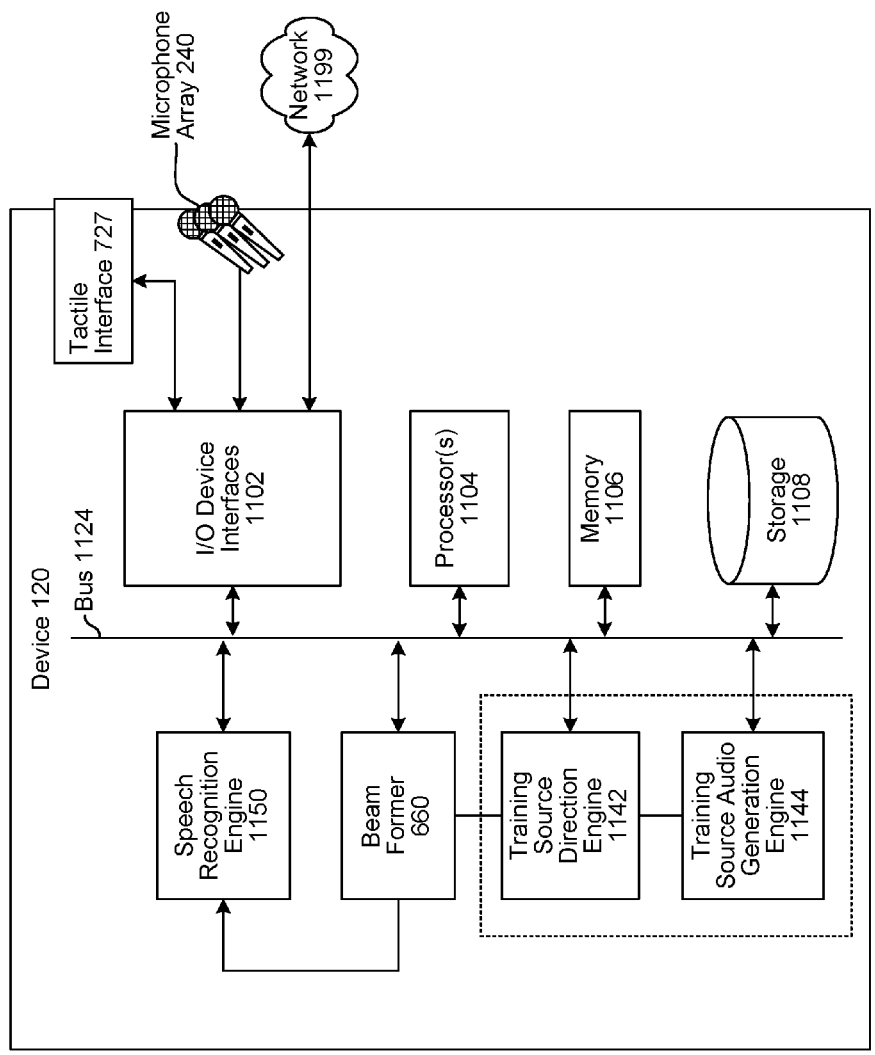
FIG. 11 is a block diagram conceptually illustrating example components of the device.

FIG. 11 is a block diagram conceptually illustrating example components of a device 120. In operation, the device 120 may include computer-readable and computer-executable instructions that reside on the device 120, as will be discussed further below. The device 120 includes the speaker array 240, such as a planar array of omnidirectional microphones 242 illustrated in FIGS. 2A to 2C, and the beam former 660 discussed in connection with FIGS. 6A to 6C.

The device 120 includes input/output device interfaces 1102. A variety of components may be connected through the input/output device interfaces 1102, such as the microphone array 240. The input/output device interfaces 1102 may also connect to a user interface. For example, the device may include a tactile interface 727 on a front surface 121, such as a mechanical light switch (fixed or variable dimmer), a touch-sensitive control (e.g., a touch-sensitive light switch), and/or a touch-sensitive display control interface. In the case of a light switch, the input/output device interfaces 1102 may connect to a relay or other circuit (e.g., a dimmer circuit) used to control an intensity of a light, based on input received at the tactile interface 727 and/or spoken commands received via the array of microphones 240.

The input/output device interfaces 1102 may also include an interface for an external peripheral device connection such as universal serial bus (USB), FireWire, Thunderbolt or other connection protocol. The input/output device interfaces 1102 may also include a connection to one or more networks 1199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

Through the network 1199, the components illustrated in FIGS. 6A, 6B, 6C, and 11 as being part of the device 120 may be distributed across a networked environment. For example, a speech recognition engine 1150 may be separate from the device 120, where data representing the time-variant audio signal y(t) 690 is sent via the network 1199 to a speech recognition engine 1150 located elsewhere in a system, with the speech recognition engine 1150 returning text and/or recognized commands corresponding to speech in the time-variant audio signal y(t) 690 to the device 120 (if the device 120 is the end-consumer of the text data).

The device 120 may include an address/data bus 1124 for conveying data among components of the device 120. Each component within the device 120 may also be directly connected to other components in addition to (or instead of) being connected to other components across the bus 1124.

The device 110 may include one or more processors 1104, that may each include a central processing unit (CPU) for processing data and computer-readable instructions, and a memory 1106 for storing data and instructions. The one or more processors 1104 may be a digital signal processor (DSP). The memory 1106 may include volatile random access memory (RAM), non-volatile read only memory (ROM), non-volatile RAM, and/or other types of memory.

The device 120 may also include a data storage component 1108, for storing data and processor-executable instructions (e.g., instructions to perform the signal processing illustrated in FIG. 6A to 6C). The data storage component 1108 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1102.

Computer instructions for operating the device 120 and its various components may be executed by the processor(s) 1104, using the memory 1106 as temporary "working" storage at runtime. The computer instructions may be stored in a non-transitory manner in non-volatile memory 1106, storage 1108, or an external device. Alternatively, some or all of the executable instructions may be embedded in hardware or firmware in addition to or instead of software.

The device 120 includes beam former 660, as discussed in connection with FIG. 6A to 6C, which is associated with storage for the directional models 666. If the device's directional acoustic models 666 are built by training the device 120 (as compared to training another device 120 and preloading the stored models), additional components used during training may be included. For example, a training source audio generation engine 1144 may output tone signals via the I/O device interfaces 1102 to a wireless receiver (not illustrated) that is positioned in various directions relative to the device 120. A training source direction engine 1142 may use one or more cameras (not illustrated) to track the wireless receiver and determine the angles θ, φ, as input into the beam former 660 during training (i.e., FIG. 6A).

As another approach to training, a computer system may control an array of speakers in a testing chamber. The computer system may be separate from the device 120, may comprise software executed by the processor(s) 1104, or some combination thereof. The testing chamber computer indicates to the model generator 665 the location (i.e., angles θ and φ) of a speaker emitting one or more test frequencies. To simplify processing, the model generator 665 may also be provided the specific frequency "f" or frequencies emitted. The computer system steps through the angles and frequencies, as the model generator 665 constructs the directional models 666.

The device 120 may also include a speech recognition engine 1150. The speech recognition engine 1150 may of conventional design, but is included in FIG. 11 to demonstrate a use case that benefits from the SNR improvement provided by the beam former 660. The device 120 may be configured to perform various actions, and the actions that can be initiated via spoken command using the speech recognition engine 1150 may include actions that can be initiated via the tactile interface 727. For example, a user 10 may control an ambient light level controlled by the device 120 by physical interaction with the tactile interface 727, and also by voice commands included in the spoken utterance 110 that are processed by the speech recognition engine 1150.

The concepts disclosed herein may be applied within a number of different devices and computer systems where arranging a microphone array in a direction of a sound source is impractical, such as with planar "smart" televisions, tablet computers, and monitors having narrow bezels, voice-controlled light switches (e.g., where inlets 726 are openings in the switch plate and the front 121 is dominated by a switch or dimmer), voice-controlled remote controls (e.g., arranging the inlets 726 along the outer edges of the remote's the button array), and for microphone to be used outdoors (where the reducing the exposure of the microphone array to the elements may afford a degree of weather resistance. As illustrated in FIG. 7A, for example, the front surface 121 of the device 120 includes a tactile interface 727, such as a light switch. As another example, the tactile interface 727 might be a touch-sensitive display control interface. The front surface 121 may also include an display, such as that of a television, tablet computer, monitor, etc.

Although the inlets 126 and 726 are illustrated as openings, acoustically transparent material may be provided in or over these openings to reduce dust and other things from entering the duct, such as covering the inlets with cloth, thin foam, or a porous grill. Although referred to as "spacers," it should be noted that the structures used as spacers may have additional functions, such as conduits for cabling to the device 120. Also, while the microphone array 240 is illustrated as being symmetric and centered on the rear surface 122, the array may be asymmetric, and may be off-center.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, acoustic receiver beam forming, and acoustic waveguide design, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details, structures, and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. The signal processing performed the beam former 660 as illustrated in FIGS. 6A to 6C may be implemented, among other ways, by firmware or software using a digital signal processor (DSP) (included in the processor(s) 1104). Signal processing such as the FFT 664 and the inverse FFT 688 may be performed by the DSP, by specialized application specific integrated circuits (ASICs), or some combination thereof.

As used in this disclosure, the term "a" or "one" may include one or more items unless specifically stated otherwise. Further, the phrase "based on" is intended to mean "based at least in part on" unless specifically stated otherwise.

What is claimed is:

1. A device comprising:
   a front surface;
   a rear surface;
   spacers that create a space filled with air for sound waves to pass over the rear surface when the device is physically coupled to a wall via the spacers;
   an array of microphones arranged to generate audio data representing the sound waves as the sound waves pass over the rear surface, the array of microphones comprising a first microphone and a second microphone;
a processor; and
a memory including instructions operable to be executed by the processor to determine an effective direction of a source of the sound waves relative to the front surface of the device by configuring the processor to:
  determine a first product by multiplying a first electrical signal from the first microphone by a first spatial filter transform associated with a first direction;
  determine a second product by multiplying a second electrical signal from the second microphone by a second spatial filter transform associated with the first direction;
  determine a first magnitude of a first sum of at least the first product and the second product;
  determine a third product by multiplying the first electrical signal by a third spatial filter transform associated with a second direction;
  determine a fourth product by multiplying the second electrical signal by a fourth spatial filter transform associated with the second direction;
  determine a second magnitude of a second sum of at least the third product and the fourth product;
  determine that the second magnitude is greater than the first magnitude; and
  select the second direction as the effective direction.

2. The device of claim 1, wherein the instructions further configure the processor to:
  determine a fifth product by multiplying a third electrical signal from the first microphone by the third spatial filter transform;
  determine a sixth product by multiplying a fourth electrical signal from the second microphone by the fourth spatial filter transform;
  determine a third sum of the fifth product and the sixth product; and
  perform an inverse Fourier transform on the third sum for a plurality of acoustic frequencies, to produce a time-variant signal.

3. The device of claim 1, wherein the array of microphones comprises at least four omnidirectional microphones and the device further comprises a plurality of foam cones arranged in an asymmetric pattern across the rear surface.

4. A method, comprising:
  detecting a first soundwave at a first microphone of a microphone array arranged on a rear surface of a device, the first soundwave propagating in a first direction substantially parallel to the rear surface;
  detecting a second soundwave at the first microphone, the second soundwave propagating in a second direction substantially parallel to the rear surface;
  determining first data representing the first soundwave and second soundwave as detected by the first microphone;
  detecting the first soundwave at a second microphone of the microphone array;
  detecting the second soundwave at the second microphone;
  determining second data representing the first soundwave and the second soundwave as detected at the second microphone; and
  determining, using the first data and the second data, an effective direction of a source of the first soundwave and the second soundwave, the effective direction relative to a front surface of the device, opposite the rear surface.

5. The method of claim 4, wherein determining the effective direction comprises:
  applying a first set of weights associated with a first direction to the first data and the second data;
  applying a second set of weights associated with a second direction to the first data and the second data;
  determining that applying the second set of weights produces a larger magnitude than applying the first set of weights; and
  selecting the effective direction to be the second direction.

6. The method of claim 5, wherein applying the first set of weights to the first data and the second data comprises:
  determining a first product of the first data multiplied by a first weight of the first set of weights;
  determining a second product of the second data multiplied by a second weight of the first set of weights;
  determining a sum of at least the first product and the second product; and
  determining a magnitude of the sum.

7. The method of claim 4, further comprising:
  determining a first product of the first data multiplied by a first weight associated with the effective direction;
  determining a second product of the second data multiplied by a second weight associated with the effective direction;
  determining a sum of at least the first product and the second product; and
  performing an inverse Fourier transform on the sum for a plurality of acoustic frequencies, to produce a time-variant signal.

8. The method of claim 4, further comprising:
  providing an air-filled space between the rear surface and a barrier that is parallel to the rear surface, there being a fixed distance between the rear surface and the barrier, the air-filled space being open along at least one edge of the rear surface, and the first microphone and the second microphone arranged on the rear surface to face the barrier.

9. The method of claim 8, further comprising:
  providing cones of acoustic foam in an asymmetric pattern on the rear surface to dampen the first sound wave after the first sound wave has propagated across at least one of the first microphone and the second microphone.

10. A device comprising:
  a front surface;
  a rear surface forming an air-filled space with an adjacent acoustic barrier;
  a plurality of structures separating the front surface from the rear surface by a fixed distance, the plurality of structures defining at least one inlet; and
  an array of microphones arranged on the rear surface to face the acoustic barrier, wherein sound entering the air-filled space through the at least one inlet propagates substantially parallel to the rear surface to cross the array of microphones.

11. The device of claim 10, the device further comprising:
  a processor configured to process data from the array of microphones in a frequency range extending from a lower frequency to an upper frequency,
  wherein the fixed distance is less than or equal to approximately one-half a wavelength corresponding to the upper frequency.

12. The device of claim 10, further comprising:
  an acoustic reflector comprising the acoustic barrier to redirect sound waves incident along at least one edge of a front surface of the device into the air-filled space.

13. The device of claim 10, wherein the array of microphones comprises at least four omnidirectional microphones, center axes of the microphones of the array of microphones being to the rear surface.

14. The device of claim 10, further comprising cones of acoustic foam arranged on the rear surface of the device in an asymmetric pattern to dampen reflections of the sound within the air-filled space.

15. A device comprising:
a front surface;
a rear surface forming an air-filled space with an adjacent acoustic barrier, the air-filled space opening along at least one edge of the rear surface;
an array of microphones arranged on the rear surface to face the acoustic barrier, wherein sound entering the air-filled space propagates substantially parallel to the rear surface to cross the array of microphones;
a processor; and
a memory including instructions operable to be executed by the processor, the instructions configuring the processor to:
determine an effective direction of a source of the sound relative to the front surface of the device based on data generated by the array of microphones in response to the sound propagating in the air-filled space.

16. The device of claim 15, wherein the array of microphones comprises a first microphone and a second microphone, the instructions to determine the effective direction further configuring the processor to:
determine a first product of a first weight associated with a first direction multiplied by first data from the first microphone, the first data representing sound incident on the first microphone;
determine a second product of a second weight associated with the first direction multiplied by second data from the second microphone, the second data representing sound incident on the second microphone;
determine a first magnitude based on a sum of the first product and the second product;
determine a third product of a third weight associated with a second direction multiplied by the first data;
determine a fourth product of a fourth weight associated with the second direction multiplied by the second data;
determine a second magnitude based on a sum of the first product and the second product; and
determine that the second magnitude is larger than the first magnitude; and select the second direction as the effective direction.

17. The device of claim 16, wherein the instructions further configure the processor to:
apply a set of weights associated with the effective direction to the data generated by the array of microphones, producing a plurality of weighted signals;
determine a sum of the plurality of weighted signals; and
perform an inverse Fourier transform on the sum, to produce output data representing a time-variant audio signal.

18. The device of claim 17, the device further comprising a tactile interface on the front surface, and a speech recognition processor, the speech recognition processor configured to receive the output data representing the time-variant audio signal to identify a speech-based command,
wherein the device is configured to initiate a same action in response to an input received by the tactile interface and in response to the speech-based command.

19. The device of claim 18, wherein the tactile interface is a dimmer configured to control an intensity level of lighting.

* * * * *